Feb. 1, 1927.
H. G. ALTVATER
1,616,342
MULTIPLE SPEED TRANSMISSION MECHANISM
Filed Nov. 2, 1923   4 Sheets-Sheet 1
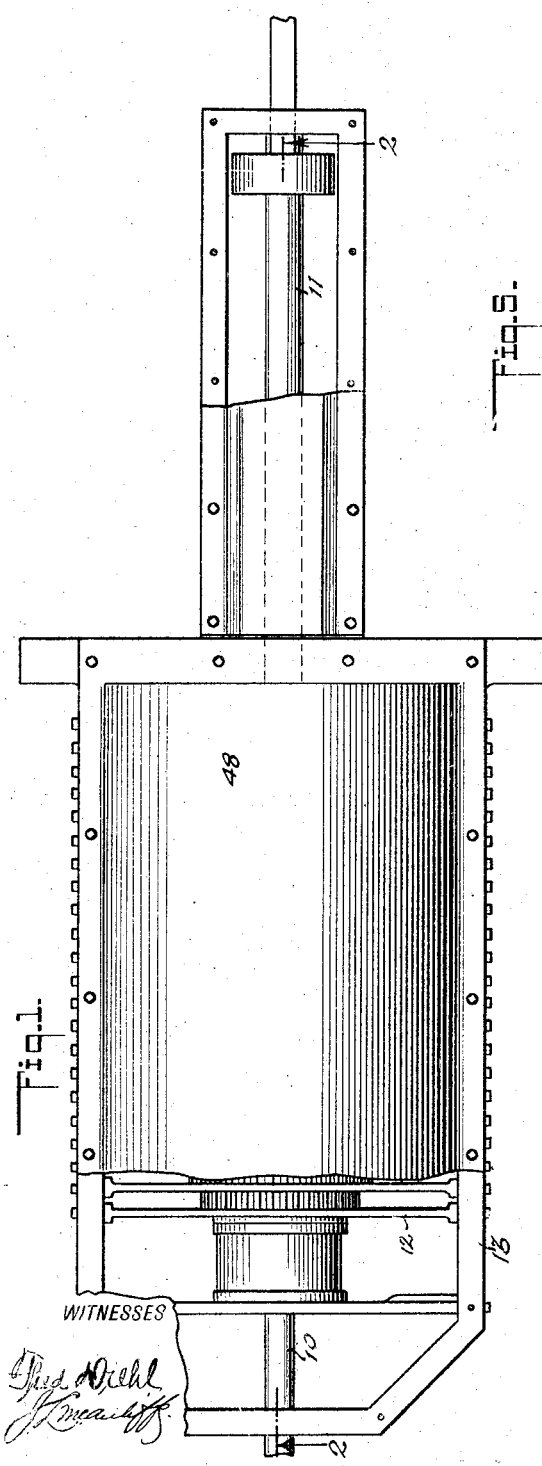
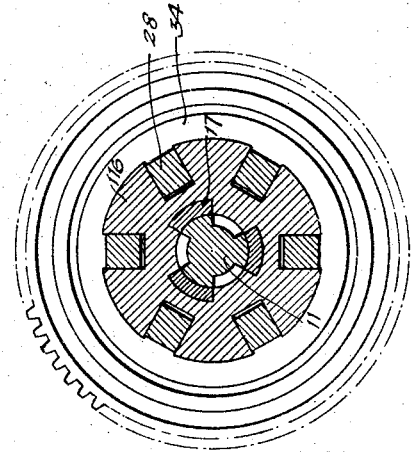
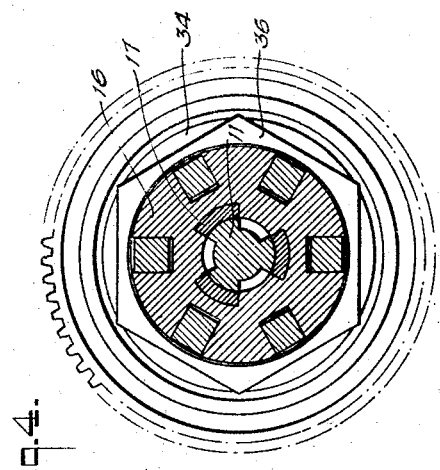
INVENTOR
HERBERT G. ALTVATER
BY
ATTORNEYS

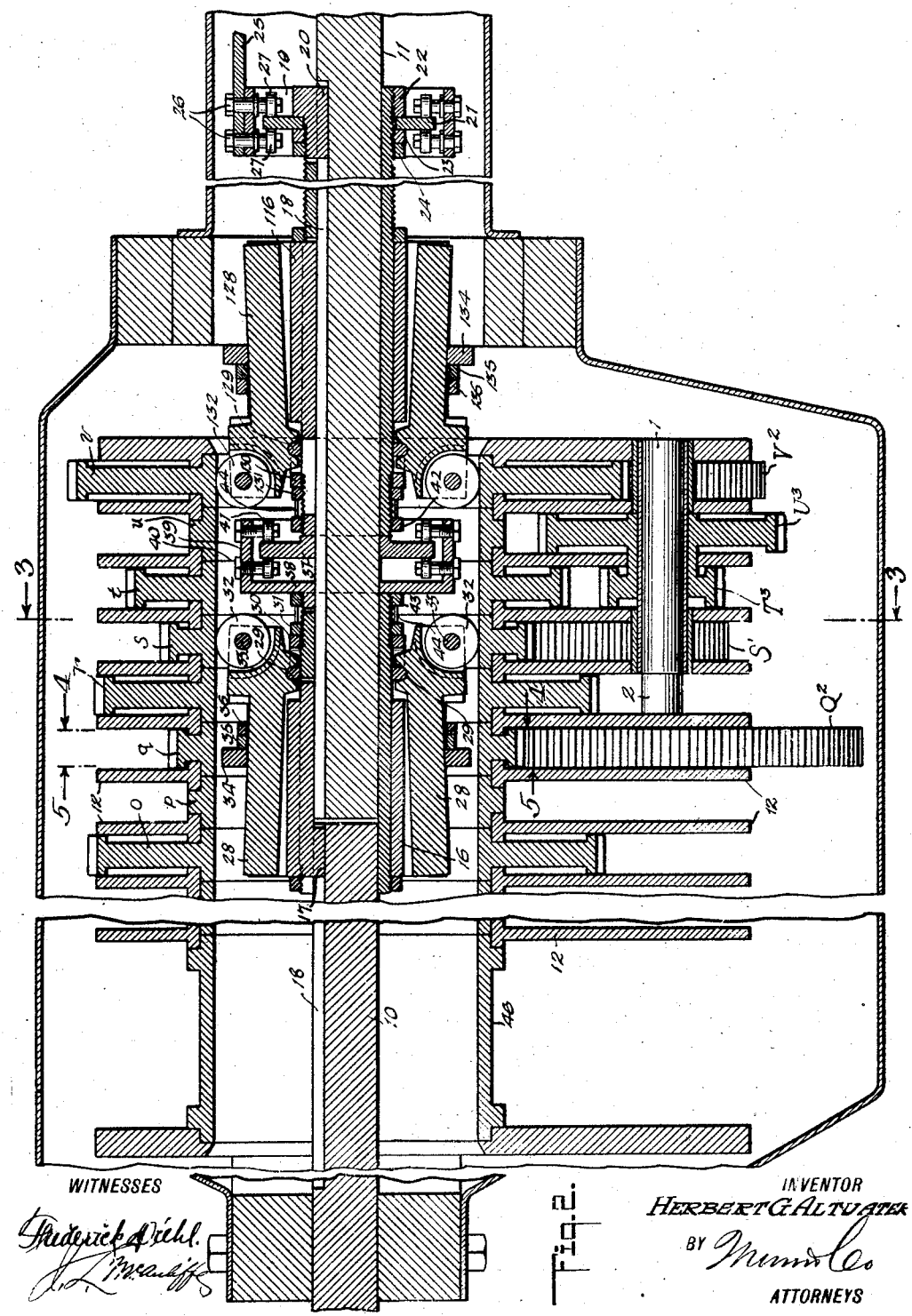

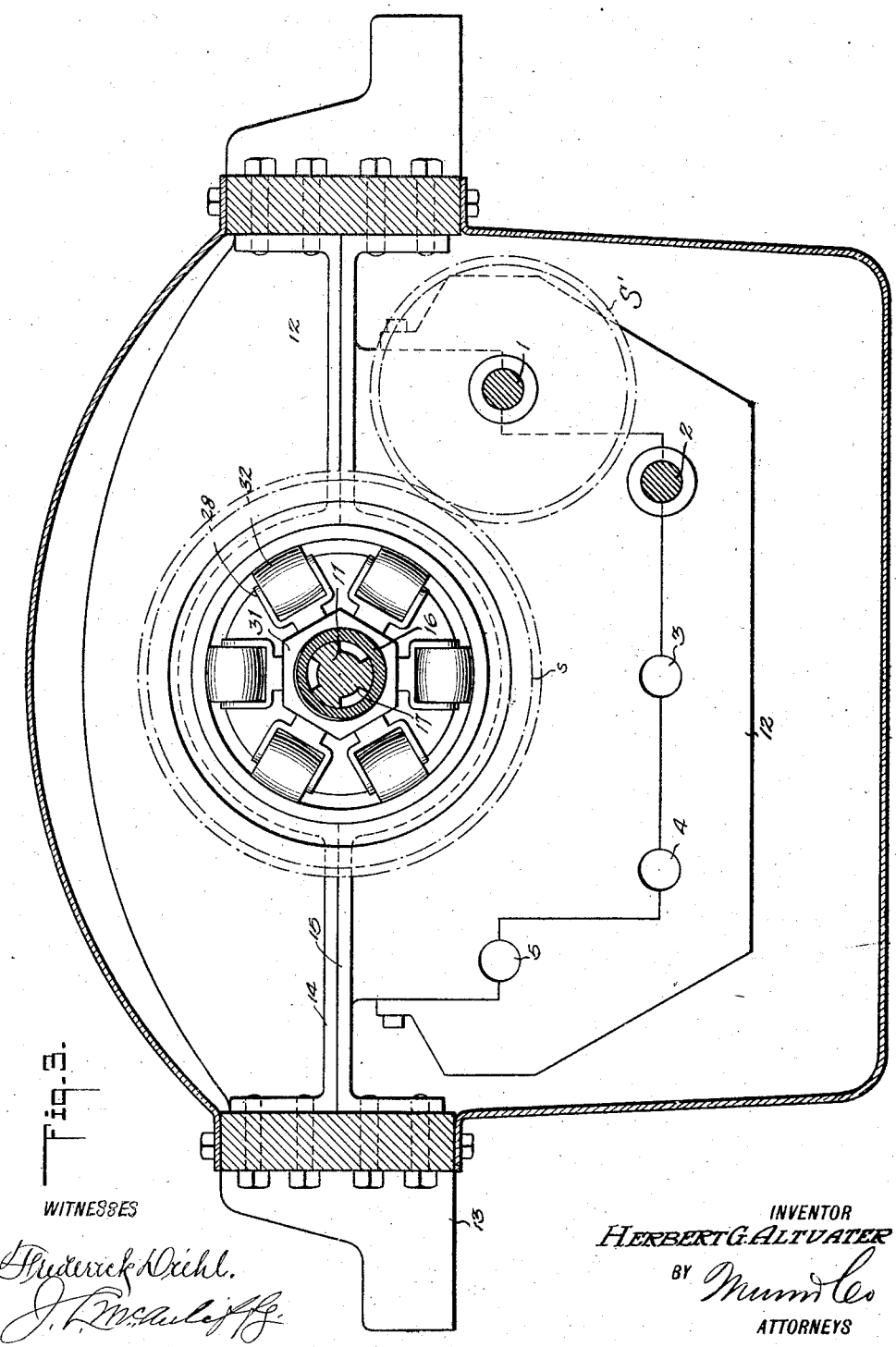

Feb. 1, 1927.

H. G. ALTVATER 1,616,342

MULTIPLE SPEED TRANSMISSION MECHANISM

Filed Nov. 2, 1923  4 Sheets-Sheet 4

WITNESSES

INVENTOR
HERBERT G. ALTVATER
BY
ATTORNEYS

Patented Feb. 1, 1927.

1,616,342

UNITED STATES PATENT OFFICE.

HERBERT G. ALTVATER, OF HOT SULPHUR SPRINGS, COLORADO.

MULTIPLE-SPEED-TRANSMISSION MECHANISM.

Application filed November 2, 1923. Serial No. 672,436.

My invention relates to multiple speed transmission mechanism and is more particularly intended for embodiment in a form to constitute an improvement on the transmission mechanism forming the subject matter of United States Letters Patent No. 1,337,578, granted to me April 20, 1920, in which drive elements and driven elements present peripheries forming part of the same cylindrical surface and in which also rollers having axes transverse to the axes of rotation of the drive and driven elements are adapted to have movement over said cylindrical surface parallel with the axes of the drive and driven elements to selectively establish drive connection between the drive and driven elements.

The present invention more particularly relates to a transmission gearing of the indicated type in which conjugate couples of drive and driven elements are established alternately with non-conjugate adjustments in such a manner that a shift from one conjugate couple to another conjugate couple for turning the driven shaft at a given speed is alternate with an intermediate adjustment to a non-conjugate relation of the drive and driven elements, whereby a drive element may be continuously rotated with the drive shaft while the driven element may or may not actuate the coaxial driven shaft according to the conjugate or non-conjugate relation of the drive and driven elements established by the intermediate gears and a shiftable clutch assemblage.

An object of the present invention is to provide a transmission gearing whereby a large number of different speeds may be obtained by simple means and in a simple manner.

The invention furthermore has for its object to provide a gearing of the indicated type improved in various particulars with respect to the shift means and otherwise with a view to insure unfailing operation and to simplify the assemblage with a view to promote facility in assembling, adjustment and control.

A further object of the invention is to obtain direct changing of speeds whereby the several operations of disengaging the power, shifting the gears, and reengaging the power, are all confined in one operation, thereby securing more perfect control.

Reference is to be had to the accompanying drawings forming a part of this specification, it being understood that the drawings are merely illustrative of one example of the invention.

Figure 1 is a plan view of a variable transmission mechanism embodying my present invention;

Figure 2 is a longitudinal vertical section as indicated by the line 2—2, Figure 1;

Figure 6:
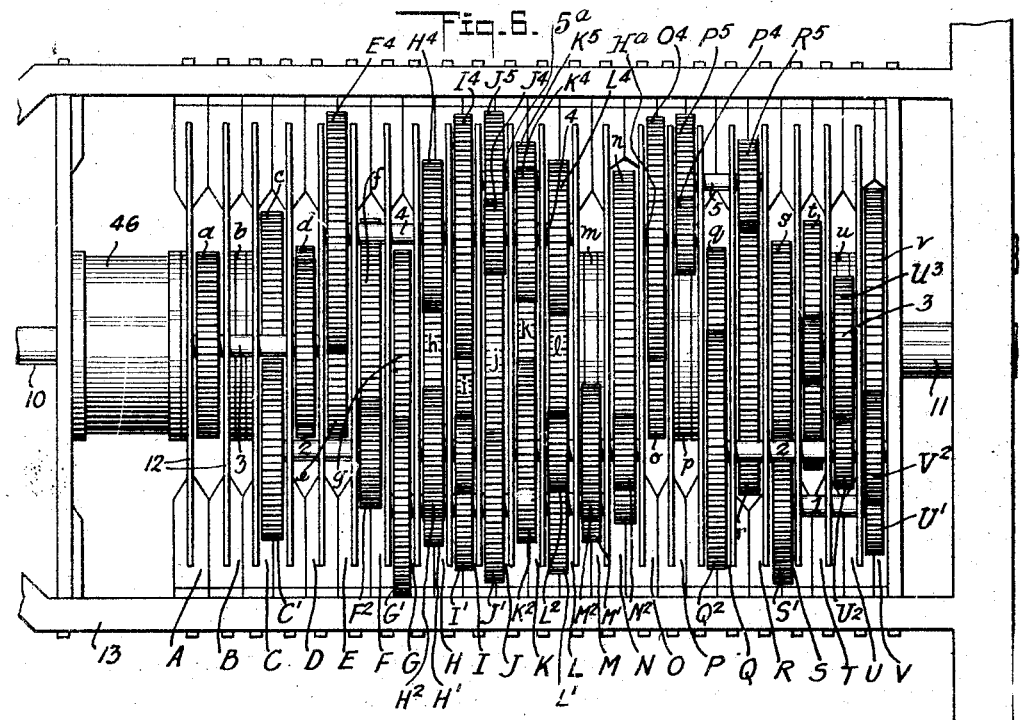
Figure 7:
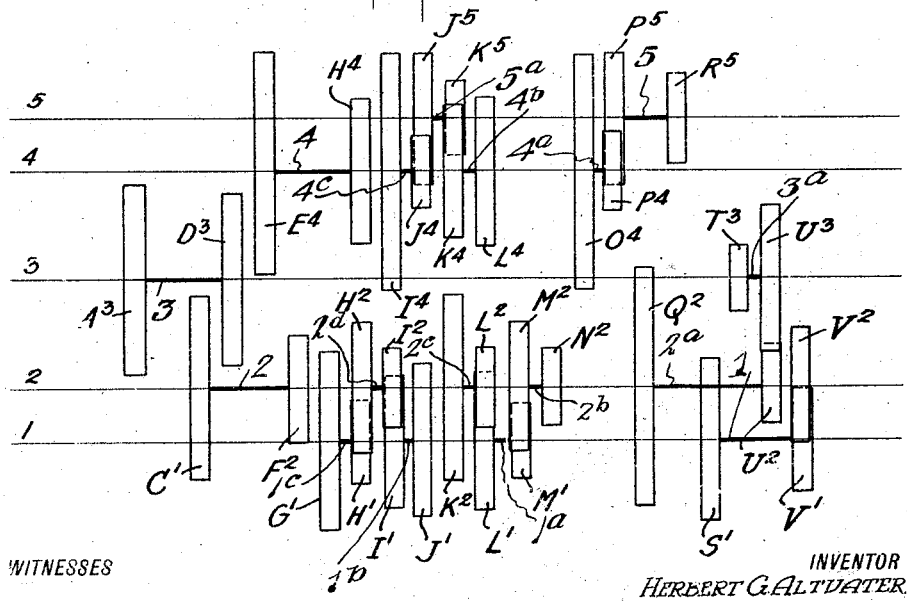

Figures 3, 4 and 5 are transverse vertical sections taken respectively in planes indicated by the lines 3—3, 4—4, and 5—5, Figure 2;

Figure 6 is an inverted plan view of the gearing;

Figure 7 is a schematic view of the intermediate gearing assemblage.

In the illustrative example of my invention the numeral 10 may be taken as indicating a drive shaft, and 11 a driven shaft in axial alinement therewith. Drive elements are associated with the driven shaft and actuated through the medium of an intervening optionally shiftable drive connection which drive connection serves also to establish connection between the selected drive element associated with the drive shaft and the selected driven element serving to turn the driven shaft. The numerals 14 and 15 indicate respectively the parallel upper and lower bearing or gear spacing members or journals which support the drive and driven elements. Members 14 and 15 are supported by frame member 13. The lower side of member 15 has five journals to support short shafts where required as indicated by shafts 1 and 2, Figure 3, hereinafter referred to. The numeral 12 indicates a member with sleeve journals for holding shafts 1 to 5, where required.

It will be useful here to briefly refer generally to the drive and driven elements, here shown as gears, as well as to a shiftable clutch associated with said drive and driven elements and to an intermediate gear train. Thus, coaxial with the drive shaft 10 and driven shaft 11 are a series of elements adapted to constitute drive and driven elements and filler or spacing elements forming parts of an interior cylindrical surface with the drive and driven elements. A slidable clutch device is shiftable along the drive and driven shaft and turnable therewith and disposed within the drive and driven elements and filler elements, and has means as explained in detail hereinafter, to engage an element to be turned with the drive shaft as well as means to engage a second element to be driven for turning the driven shaft or for idling. A train of intermediate gears is provided, so that one of the elements coaxial with the drive and driven shafts, will be driven from the drive shaft by the action of the clutch, and the element thus driven will, through the intermediate train of gearing, cause a second clutched one of said elements coaxial with the drive and driven shafts to be driven for turning the driven shaft.

For the convenience of description I will designate the drive and driven gear elements and the interposed filler elements by letters in the order in which said elements are arranged. Thus, from left to right, referring to Figure 6, the spaces between the bearing members 12 are designated by the capital letters A to V. Certain non-driving elements are employed in my novel assemblage, and so coordinated with the drive and driven elements of the assemblage that compactness results while making provision for a large number of gear shifts—22 in the illustrated example as will appear. The non-driving elements functioning purely as spacing or filler elements in association with the novel arrangement of drive and driven gear elements are lettered $b$, $m$, $p$ and $u$ and they form with the drive and driven elements a series of elements bearing the consecutive letters $a$ to $v$ reading from left to right, Figure 6. The spaces lettered A to V receive the drive and driven gear elements and the filler elements, all coaxial with the drive shaft 10 and driven shaft 11. The intermediate train of gears is mostly made up of conjugate couples mounted on short shafts designated 1, 2, 3, 4 and 5. In the diagram, of the intermediate gearing, Figure 7, I have designated the axes of the various groups of the intermediate gears by the numbers 1 to 5 because corresponding with and representing the short shafts 1, 2, 3, 4, 5. In Figure 7, which gives a schematic view of the intermediate gearing in the interest of clearness, the axes are designated in the order 1 to 5. Those shafts along the axis 1, I have designated as 1, $1^a$, $1^b$ and $1^c$; those shafts disposed along the axis 2, I have designated as 2, $2^a$, $2^b$, $2^c$ and $2^d$; those shafts along the axis 3, I have designated as 3 and $3^a$; those shafts along the axis 4, I have designated as 4, $4^a$, $4^b$ and $4^c$; and those shafts along the axis 5, I have designated 5 and $5^a$. All of said shafts turn in the gear spacing bearing members 12. The intermediate gears turning about the axes 1, 2, 3, 4, 5, are in planes corresponding with the spaces A to V between the bearing members 12. Said spaces between the bearing members 12 being thus designated respectively by the capital letters A to V in Figure 6, those elements in the intermediate gearing in the diagram, Figure 7, in positions corresponding with said spaces, have been designated by corresponding capital letters A to V but with exponents identifying the axes about which the different elements of the intermediate gearing turn, that is to say, (reading from left to right of Figure 7) by the characters $A^3$, $C'$, $D^3$, $E^4$, etc. In the intermediate gearing assemblage is at least one element in the spaces A to V except the space B. The elements of the intermediate gear ($A^3$, $C'$, $E^4$, etc.) are in the spaces A to V and therefore in the planes of the elements $a$ to $v$. Said intermediate gear elements forming the conjugate or non-conjugate couples are spaced varying distances according to the situations in the assemblage to make for compactness while attaining the maximum number of gear shifts for the given number of gears and in a given total space. From Figure 7 it will be noted therefore that there is not a uniformity in the length of those shafts of the intermediate gear along the axes 1, 2, 3, 4, 5. For example, four shafts along axes 1, 2, 3, 4 and numbered 1, 2, 3, 4 are of the same length. The shaft adjacent the axis 1, that is, shown near the lower right-hand corner of Figure 7, and numbered $2^a$ is longer while at other parts of the intermediate gear the shafts such as $1^a$, $1^b$, $1^c$, $2^b$, $2^c$, $2^d$, are simply of a length to pass through one of the bearing elements 12 so that the elements formed into a couple by said shafts lie in adjacent spaces. The thickened lines in the diagram, Figure 7, along the respective axes 1, 2, 3, 4, 5, represent the positions of the short shafts, numbered 1, 2, 3, 4, 5 in Figure 6, which shafts connect certain elements of the intermediate gearing in couples.

A shiftable carrier (16, 116) composed of sections is sleeved on the shafts 10, 11 to have longitudinal movement and has a key 17 movable in registering grooves 18 in the drive shaft 10, so that the carrier will rotate with the drive shaft but may be shifted longitudinally along the shafts. The carrier will be hereinafter generally referred to as 16, one of the sections being designated 116 in the interest of clearness; to wit, that section concentric with the driven shaft 11. A control assemblage 19 is slidably mounted on the driven shaft 11 and has a key 20 slidable in the groove 18 of said shaft. On the slide 19 is a flat ring or disk 21 lying against a collar 22 on said slide and held by a nut 23 and lock nut 24. A shift rod 25 is connected with the slide 19 to be optionally operated for moving said slide longitudinally, said rod being shown secured by bolts 26 to the slide and the bolts having pairs of rollers 27 between which the ring 21 is disposed so that the shifting of the rod 25 longitudinally will, through the medium of the bolts 26, rollers 27 and ring 21 carry the slide 19 along the driven shaft 11. On the carrier 16 I provide a lever or levers 28 disposed longitudinally with the axes of the shafts and fulcrumed on a ring 29. Said levers 28 are held against displacement by a nut 30 and lock nut 31 on the carrier 16 which thus serves to carry the levers. Each lever 28 mounts a roller 32 turning on pin 33, said pin being transverse to the axis of the shafts 10, 11 so that the several rollers 32 thus turn about transverse axes. Use is made of the rollers 32 as an example of means to selectively effect driving engagement with one of the elements $a$, $b$, $c$, etc. The rollers 32 have clutching or holding and driving contact with whichever of the elements $a$, $b$, $c$, etc., that is engaged by said rollers 32. To rock the levers 28 on their fulcrum ring 29 and so adjust the levers as to maintain driving engagement with an element, $a$, $b$, $c$, etc., I provide a ring 34 embracing the levers and slidable along the same. Said ring 34 is held in adjusted position by a nut 35 and lock nut 36. Thus, the turning of the drive shaft 10 will cause the turning of the carrier 16 and the levers 28, and by reason of the engagement of the rollers 32 with a particular element $a$, $b$, $c$, etc., will cause said selected element to be driven with the drive shaft 10.

I provide a second lever or a set of levers 128 carrying rollers or equivalent clutch means 132 to effect operative engagement with a second one of the elements $a$, $b$, $c$, etc. The levers 128 are shown fulcrumed on a ring 129 and held against displacement by a ring nut 130 and a lock nut 131. To rock the levers 128 and adjust the same to maintain engagement of the rollers 132 with the selected element $a$, $b$, etc., a slide ring 134 embraces said levers and is held in place by a ring nut 135 and lock nut 136.

A coupler assemblage is provided between the sections of the carrier 16. On the one section 116 is a radial flange 37 and a coupler disk 38 is secured to or formed upon the other section of the carrier 16 and terminates in an annular flange 39 concentric with the axis of the drive and driven shafts 10, 11. The flange 39 has a series of radial bolts 40 carrying rollers 41 at opposite sides of the flange 37. Thus, a longitudinal movement of the carrier section 116 in response to the movement of the shift rod 25 will through the flange 37, rollers 41, bolts 40, flange 39, and disk 38, cause a corresponding longitudinal movement of the other section of the carrier 16, whereby the levers 28 and 128 will be carried longitudinally to shift the engagement of the rollers 32 and 132 to selectively engage particular gears $a$, $b$, $c$, etc. The ring nuts 42, 43 are provided on the sections of the carrier 16, to position the described coupler between the carrier sections. Also, spring locking rings 44 are provided adjacent the rings 42, 43, between the same and the lock nuts 31 and 131.

For direct drive a driven element 46 is provided of a length to accommodate both the rollers 32 and 132. Thus, a drive is established through the element 46 between the drive shaft and the driven shaft which will result in a corresponding drive of the two shafts at the same speed and in the same direction. The direct drive through the driven element 46 is due to the fact that when both rollers 32 and 132 are disposed within and contacting with said driven element 46, there is no drive through any of the elements $a$ to $v$. This is so because element 46 is turning with the drive shaft 10 and at the same speed as said drive shaft and the drive is without any change of speed from the said drive shaft 10 through the carrier 16, the described coupler assemblage composed of the elements 37 to 41, the carrier section 116, and control assemblage 19 to the shaft 11 at the same speed as the shaft 10.

It will be noted that the whole mechanism is mounted in a horizontal position with the interior of the gears substantially open whereby oil may run in the ends of the mechanism and be forced out between the gear elements and bearing elements by centrifugal force.

With the above described drive and driven elements, intermediate gear assemblage, and slidable clutch, various speeds are possible as follows:

(1) A direct drive results when both clutch rollers 32 and 132 are holding the element 46.

(2) A neutral speed results when roller 32 holds element 46 and roller 132 holds the driven element $b$ in space B, said driven element $b$ being merely a filling or spacing element.

(3) A neutral speed results when roller 32 holds element 46 and roller 132 is in the plane of the space C and therefore holding the gear $c$, the neutral speed resulting from the fact that the turning of element 46 by the roller 32 does not drive an element of a couple in the intermediate gear. Thus the gear $c$ held by roller 132 is not driven and does not therefore cause turning of shaft 11.

(4) Speed No. 2 is obtained when roller 32 is in the space A and therefore holding the gear element $a$ to drive shaft 10, and roller 132 is in the space D and therefore holding the element $d$ as a driven gear element and causing carrier section 116 and shaft 11 to turn, the drive being from the drive shaft 10 by carrier section 16 and clutch roller 32 to gear element $a$, to intermediate gear element $A^3$ with which element $a$ is in mesh, and by the other element $D^3$ in couple with element $A^3$, the gear element $d$ is driven and drives the carrier section 116 held to element $d$ by roller 132 and lever 128. The turning of carrier section 116 turns driven shaft 11 to which said carrier section is keyed.

(5) A neutral speed when roller 32 is at the space B and the roller 132 is at the space E, there being no turning of the driven shaft in this instance because the element $b$ is merely a filler and idler and there is no drive element in the plane of the space B and therefore roller 32 is not driving and thus element E held by roller 132 is not driven to drive shaft 11.

(6) Speed No. 3 is obtained when roller 32 is in the space C and therefore driving the gear $c$ and roller 132 is in the space F and holding the gear $f$ clutched to shaft 11, the drive in this instance being from the gear $c$ to the gear $C'$ of the intermediate gearing (in mesh with gear $c$) and the element $F^2$ in couple with $C'$ to gear element $f$ (in mesh with element $F^2$) which element through holding roller 132 and carrier section 116 turns the driven shaft 11.

(7) A neutral speed is obtained when roller 32 is in the space D and therefore holding the gear element $d$ and the roller 132 is in the G space and holding the gear element $g$. In this instance the roller $D^3$ in mesh with and driven by the gear $d$ turns idly with the other gear element $A^3$ in couple with $D^3$ and there is no transmission of the speed to the element $g$ held by the roller 132 and hence there is no drive of shaft 11.

(8) Speed No. 4 is obtained when the clutch roller 32 is in the E space and roller 132 is in the H space. In this instance holding roller 32 holds gear element $e$ to shaft 10, and gear element $e$ is in mesh with and drives the element $E^4$ of the intermediate gear and thereby drives the element $H^4$ in couple with $E^4$ so that said element $H^4$ drives the gear $h$ held by clutch roller 132 and thereby turns the driven shaft 11 by the turning of coupler section 116 keyed to said shaft.

(9) A neutral speed is obtained when roller 32 is in the F space and 132 is in the I space, the drive now being from shaft 10 and holding roller 32 to gear $f$ to element $F^2$ of the intermediate gear (in mesh with gear $f$), which intermediate gear element $F^2$ turns idly with the element $C'$ in couple therewith, there being in this instance no transmission from the element $F^2$ to the gear $h$ held by the roller 132.

(10) Speed No. 5 is obtained when roller 32 is in the G space and roller 132 is in the J space, the drive in this instance being from roller 32 to the gear $g$ which meshes with and actuates the element $G'$ of the intermediate gear and the element $H'$ in couple with $G'$. The element $H'$ in turn drives the element $H^2$ and in synchronism therewith element $I^2$ in couple with element $H^2$. The element $I^2$ is in mesh with the element $I'$ of the intermediate gear turning said element $I'$ and with it the element $J'$ in couple therewith, said element $J'$ being in mesh with the element $j$ in the J space and held by roller 132 to coupler section 116 and driven shaft 11.

(11) A neutral speed is obtained when the roller 32 is in H space and roller 132 is in the K space, the drive now being from roller 32 to gear element $h$ which is in mesh with element $H^4$ which element $H^4$ turns idly with the element $E^4$ in couple therewith.

(12) Speed No. 6 is obtained when roller 32 is in the plane of the I space and roller 132 is at the L space in which case gear element $i$ driven by holding roller 32 meshes with and turns element $I^4$ of the intermediate gear and with it the element $J^4$ in couple therewith, said element $J^4$ being in mesh with the element $J^5$ which turns the element $K^5$ in couple therewith which in turn actuates gear element $K^4$ and with it the element $L^4$ in couple with said element $K^4$, said element $L^4$ being in mesh with the gear element $l$ now held by roller 132 to cause turning of the driven shaft 11 through carrier section 116 and control assemblage 19.

(13) A neutral speed is obtained when roller 32 is in the plane of the J space and roller 132 is in the plane of the M space in which case the holding roller 32 causes turning of the gear element $j$ with drive shaft 10 which element $j$ is in mesh with the element $J'$ of the intermediate gearing assemblage, said element $J'$ turning idly with the element $I'$ in couple therewith.

(14) Speed No. 7 is obtained when roller 32 is at the K space and roller 132 at the N space in which event shaft 10 and holding roller 32 turn the gear element $k$ which is in mesh with the element $K^2$ which turns the element $L^2$ in couple therewith, said element $L^2$ being in mesh with the element $L'$ and thus turning the coupled element $M'$ which is in mesh with the element $M^2$ which drives the element $N^2$ in couple therewith, said element $N^2$ being in mesh with the element $n$ held by the clutch roller 132 to thereby cause turning of the driven shaft 11.

(15) A neutral speed is obtained when roller 32 is at the L space and roller 132 is at the O space, the drive being from 32 to the gear element $l$ which is in mesh with the element $L^4$ which turns idly with the element $K^4$ in couple therewith and those elements driven idly by the turning of said element K⁴, there being thus no drive transmitted to the gear element $o$ held by the clutch roller 132 and hence no turning of carrier section 116 and shaft 11.

(16) Speed No. 8 is obtained completely idle, or ineffective on the driven shaft 11, when roller 32 is at the M space and roller 132 at P space because in this instance the roller 32 holds the mere idler element $m$ and roller 132 holds the mere idler element $p$. Hence, there is no one of the gear elements actuated by shaft 10 and no one of said gear elements drives roller 132 and shaft 11.

(17) A neutral speed is obtained when roller 32 is at the N space and roller 132 at the Q space because in this instance the gear element $n$ driven by roller 32 idly turns the gear element N² and the element M² in couple therewith as well as the idle turning of the elements M′, L′, L² and K² driven from the element M².

(18) Reverse speed No. 9 is obtained when roller 32 is at the O space and roller 132 is at the R space, the drive being from element $o$ driven by the roller 32 to the element O⁴ (in mesh with element $o$) and the element P⁴ in couple with element O⁴, thence to the element P⁵ in mesh with the element P⁴ to the element R⁵ in couple with the element P⁵ so that the drive is from element R⁵ to the element $r$ and thence by holding roller 132, lever 128 and coupler section 116, to the driven shaft 11.

(19) A neutral speed is obtained when roller 32 is at the P space and roller 132 at the S space because the element $p$ driven by shaft 10 through the clutching and driving action of holding roller 32, is a mere filler element which merely idles and there is no drive to any of the gear elements and hence no drive of carrier section 116 and shaft 11.

(20) Reverse speed No. 10 is obtained when the roller 32 is at the Q space and roller 132 at the T space, the drive in this instance being from the element $q$ to element Q² in the intermediate gear (with which element Q² the element $q$ is in mesh), the turning of element Q² serving to synchronously turn the element U² in couple with element Q², said element U² being in mesh with element U³ which is in couple with the element T³, said element T³ being in mesh with the element $t$ to turn the shaft 11 through holding roller 132, lever 128 and carrier section 116.

(21) A neutral speed is obtained when roller 32 is in the R space and roller 132 is in the U space. There are two reasons for the neutral speed, the element $u$ being a mere filler or idler having no driving connection with the drive gear elements, and also the element $r$ at this time meshes with and drives the element R⁵ which idly turns the element P⁵ in couple therewith and idly turns the element P⁴ in mesh with element P⁵ and the element O⁴ in couple with element P⁴.

(22) Reverse speed No. 11 is obtained when roller 32 is at the S space and roller 132 is at the V space, the drive being from the element $s$ driven by roller 32 to the element S′, of the intermediate gear meshing with element $s$, the element V′ in couple with element S′, the element V² in mesh with element V′, and from element V² to the element $v$ and thence by holding roller 132, lever 128 and coupler 116 to the driven shaft 11.

It will thus be seen that when a driving connection is established through the intermediate gearing assemblage between an element of the series A to V held by roller 32 and a second element in said series held by roller 132 remote from the element held by the roller 32, the drive and driven elements held by the roller 32 and roller 132 form a conjugate couple whereas alternately with the forming of a conjugate couple a non-conjugate pair of elements in the series A to V is formed.

It will be noted that the transmission groups of elements in the intermediate gear for establishing a driving connection between a drive gear element included in the series of elements $a$ to $v$ and a driven gear element included in said series, correspond with the spacing of the elements 32 and 132 so that with the clutch roller 32 in engagement with a drive element in the series $a$ to $v$ the roller 132 will be in holding engagement with that driven element fourth to the right from the element engaged by the clutch roller 32. In other words the initial and final elements in a given transmission group of intermediate gear elements are in the same planes as the holding rollers 32 and 132.

It is to be further noted that the clutch means by the action of the elements 32 and 132 constitutes a control to bring about the various speed drives including the neutral drives and it is to be observed that for effecting such control the elements 32 and 132 have such a relation to the gears $a$ to $v$ and to the intermediate pinions A³ to V² that alternate spaces (A to V) which the clutch control passes over furnish driving power at different speed ratios in regular progression, and that alternate spaces A to V furnish neutral speeds; also that the alternate driving spaces occur between the alternate neutrals; that whenever the rollers 32 and 132 grip a non-conjugate gear pair a neutral speed results. Also, it is to be noted that there are one each of the ring gears (one driven and one driving) of two different speeds placed between the two ring gears (one driving and one driven) of another single speed. Referring to Figure 2 of the drawings, it will be observed that the clutch rollers 32 and 132 engage the ring gears *s* and *v*, respectively. Now, if it be assumed that the control by the clutch rollers has moved to the left two spaces so that the clutch rollers 32 and 132 engage the gears *q* and *t* respectively; in this latter position there are, of course, the ring gears *r* and *s* between the ring gears *q* and *t* but gear *r* belongs to the conjugate pinion arrangement of the speed *o* to *r* and *s* belongs to the conjugate pinion arrangement of the speed *p* to *s*. It will be observed, however, that in the stated assumed position the gears *r* and *s* are both between the ring gears *q* and *t* of the conjugate pinion arrangement of the speed *q* to *t*. Therefore, there is one each of the ring gears (*r* and *s*) of the ring gears of the two different speeds *o* to *r* and *s* to *v*) placed between the two ring gears *q* and *t* of another single speed *q* to *t*.

It is to be understood that the described multiple-speed transmission mechanism is applicable to stationary shafting, railroad locomotives, and other pieces of machinery, as well as to automobiles.

I would state in conclusion that while the illustrated example constitutes a practicable embodiment of my invention, I do not limit myself strictly to the exact details herein illustrated, since, manifestly, the same can be considerably varied, without departure from the spirit of the invention as defined in the appended claims.

Having thus described my invention, I claim:

1. In a variable speed transmission gear, in combination with a drive and driven shaft: a series of revoluble elements adapted to constitute drive and driven elements, an intermediate gear assemblage comprising gear groups forming driving connection between various predetermined pairs of spaced elements in said series, and an optionally shiftable clutch assemblage comprising members turning respectively with the drive and driven shafts as well as clutch members spaced a distance to selectively effect holding engagement with the elements of any of the pairs of spaced elements of said series, for establishing driving connection from the drive shaft, through a selected group in the intermediate gear assemblage, to the driven shaft.

2. A variable speed transmission gear to establish connection between a drive and a driven shaft, comprising a series of revoluble elements adapted to constitute drive and driven elements, a clutch assemblage having holding members adapted to variously engage two remote elements of said series, said assemblage being optionally shiftable to variously position said holding elements relatively to the elements in said series, and an intermediate gear assemblage having groups of drive elements so related to the elements of the first series and to the spacing of said holding members as to establish alternately conjugate couples and non-conjugate pairs of elements in said series of elements, by a shifting movement of the clutch assemblage.

3. In a variable speed transmission gear, a series of elements adapted to constitute drive and driven elements, an intermediate gear assemblage composed of a plurality of elements grouped in relation to one of the series of elements, and to a second one of the series of elements remote from the first one, and means to selectively cause an element of said series to drive one of said groups and to cause a remote element of said series to be driven by the selected group, the elements of the first series having such a relation to the grouped intermediate elements that alternate driven elements in the first series will be in conjugate and non-conjugate relation to the element of the first series driving a selected group.

4. In a variable speed transmission gear and in combination with a drive shaft and a driven shaft, a series of elements adapted to constitute drive and driven elements, an intermediate gear assemblage composed of elements adapted to constitute various groups, each group adapted to be driven by an element of said series and to drive a second element of said series remote from the element driving the group, and means to selectively effect holding engagement between the drive shaft and the element of said series constituting the drive and between the driven one of said series and the driven shaft.

5. In a variable speed transmission gear, a series of revoluble elements adapted to constitute drive and driven elements, intermediate means to cause one of said elements to drive, in pair with the drive element, a second element remote from the drive element, and means optionally shiftable to the several pairs in succession, alternate pairs of the first series when engaged by the shiftable means, constituting respectively conjugate couples and non-conjugate pairs of elements.

6. In a transmission mechanism, a drive shaft, an alined driven shaft, a clutch carrier sleeved on said shafts and engaging the same to turn therewith, said carrier longitudinally slidable along said shafts, levers rockable radially on said carrier, drive and driven elements outside of said carrier and levers and concentric with said shafts, means to actuate said drive and driven elements in pairs formed of elements spaced from each other by intermediate elements, means on the levers adapted to engage said pairs of drive and driven elements, and means to shift said carrier longitudinally.

7. In a transmission mechanism, a drive shaft, an alined driven shaft, a clutch carrier sleeved on said shafts and formed of sections engaging the respective shafts to turn therewith, said carrier longitudinally slidable along said shafts, levers rockable radially on each of said carrier sections, drive and driven elements outside of said carrier and levers and concentric with said shafts, rollers on said levers and turning on axes transverse to the axes of the shafts, said rollers adapted to engage said drive and driven elements in pairs composed of elements remote from each other, means on said carrier affording fulcrums for said levers, rings embracing said levers and movable along the levers to rock the same on their fulcrums, means to lock said rings in adjusted position and intermediate drive means to actuate the one element of a pair by the driving of the other element of the pair.

8. In a transmission mechanism, a drive shaft, an alined driven shaft, a clutch carrier sleeved on said shafts and formed of sections engaging the shafts to turn therewith, said carrier longitudinally slidable along said shafts, levers rockable radially on said carrier, drive and driven elements outside of said carrier and levers and concentric with said shafts, means on the levers adapted to engage a pair of said elements as drive and driven elements, and intermediate drive means to cause the second elements of a pair of engaged elements to be driven with the driving of the other engaged element of the pair, the drive and driven elements constituting alternately elements of a conjugate couple and a non-conjugate pair.

9. In a transmission gearing in association with a drive and a driven shaft: drive and driven elements concentric with the shafts, intermediate drive means between certain of said elements and other remote elements, a carrier sleeved on the shafts and formed of two separate sections, levers on the sections having means to engage the said elements, said carrier shiftable to variously engage the elements in alternate conjugate couples and in non-conjugate pairs, and a coupler interposed between the carrier sections and levers to cause one carrier section to respond to movements of the other section.

10. In a transmission gearing of the class described and in association with a drive and a driven shaft: a series of drive and driven elements, means to drive, from one of said elements, a second remote one of said elements in conjugate relation with the driving element and to drive in non-conjugate relation alternate driven elements in the series, filler elements disposed between certain of the elements of the series, a clutch assembling slidable on the shafts within said series of elements and having spaced members to selectively engage a given driving and a given driven element and adapted successively to engage said elements alternately in pairs by shifting of said clutch assemblage, and a direct drive element of a length to be engaged by said separated members of the clutch assemblage.

11. In a transmission gearing and in association with a drive and a driven shaft: drive and driven elements concentric with the shafts, an intermediate gear train between said elements to drive a selected one of said elements from another selected one of said elements, and a clutch means for establishing connection between the drive and driven shafts and the drive and driven elements and shiftable to engage a drive element with the drive shaft and engage a driven element with the driven shaft, said clutch means disposed between the drive shafts and the drive and driven elements and within the latter.

12. In a transmission gearing and in association with a drive and a driven shaft; a series of drive and driven elements concentric with the shafts, an intermediate gear train between said elements to drive one of said elements from another of said elements, and a clutch means for establishing connection between the drive and driven shafts and the respective drive and driven elements and shiftable to engage a drive element with the drive shaft and engage a driven element with the driven shaft, alternate elements in said series, when driven from the drive shaft, forming with remote alternate elements conjugate couples alternating with non-conjugate pairs by the shifting of the clutch means from two engaged elements to the elements at either side.

13. In a transmission gear, a drive shaft, a driven shaft, a series of elements adapted to constitute drive and driven elements, an intermediate drive assemblage actuating certain of said elements from others of said elements, and a shiftable means to control the drive connection between the drive shaft and a driven element and in constant driving connection with the drive shaft and coacting shiftable means constrained to move in unison with the first shiftable means and in constant engagement with one or other of said elements to be driven by the latter, said coacting shiftable means being in driving connection with the driven shaft.

14. In a transmission gearing, a drive shaft, a driven shaft, a series of elements adapted to constitute drive and driven elements, an intermediate drive assemblage actuating certain of said elements from others of said elements, and a shiftable means to control the drive connection between the drive shaft and a driven element and between a driven element and the driven shaft, said shiftable control means having drive rollers mounted on axes transverse to the drive shaft and engageable with peripheral surfaces of the drive and driven elements.

15. In a transmission gearing, a drive shaft, a driven shaft, a series of elements adapted to constitute drive and driven elements, an intermediate drive assemblage actuating certain of said elements from others of said elements, and a shiftable means to control the drive connection between the drive shaft and a driven element and between a driven element and the driven shaft, said shiftable control means having drive rollers mounted on axes transverse to the drive shaft and engageable with internal peripheral surfaces of the drive and driven elements.

16. In a variable speed transmission gear and in combination with a drive and a driven shaft: a series of gears adapted to constitute drive and driven elements, intermediate transmission gears forming a drive connection between various elements of said first-mentioned gears to cause selected ones to be driven at progressive speed from selected driving gears in series, and controlling means to selectively effect drive connection between the drive shaft and a gear to be driven thereby and between a driven gear and the driven shaft, said control movable successively over the first-mentioned series of gears and furnishing power in different speed ratios in regular progression.

17. In a variable speed transmission gear and in combination with a drive and a driven shaft: a series of gears adapted to constitute drive and driven elements, intermediate transmission gears forming a drive connection between various elements of said first-mentioned gears to cause selected ones to be driven at progressive speed from selected driving gears in the series, and controlling means to selectively effect drive connection between the drive shaft, and a gear to be driven thereby and between a driven gear and the driven shaft, said control movable successively over the first-mentioned series of gears and furnishing power in different speed ratios in regular progression; alternate driven gears in the first-mentioned series furnishing neutral speeds when engaged by said control means, and alternate driven gears when gripped furnishing power speeds.

18. In a variable transmission gear in combination with a drive and a driven shaft, a series of gears adapted to constitute drive and driven elements, an intermediate transmission gear assemblage forming drive connections between certain gears of said series and other remote gear elements of said series, said intermediate gear assemblage comprising gear elements in the planes of and meshing with gears in said series, the gears of said assemblage lying in alternate planes forming neutral drives alternating with active drives of said remote gear elements.

19. In a transmission gearing, a drive shaft, a driven shaft, a series of elements adapted to constitute drive and driven elements, shiftable means to control the drive connection between the drive shaft and a driven element and between a drive element and the driven shaft, two or more intermediate secondary gearing axles actuating certain of said elements in reverse rotation from others of said elements, said shiftable control means having drive rollers mounted on axes transverse to the drive shaft and engageable with the internal peripheral surfaces of the driven and drive elements.

20. In a transmission gearing adapted to transmit power from a drive shaft to a driven shaft, conjugate and non-conjugate annular drive and driven elements fixedly mounted to a frame, independent drive connection between invariable pairs of such annular drive and driven elements, shiftable means to establish driving connections from drive shaft to said annular drive and driven elements, shiftable means to establish drive connection from such annular drive and driven elements to said driven shaft, an additional direct drive element, all of such annular drive and driven elements together forming a continuous coaxial sectional peripheral cylindrical surface, frictional contact rollers mounted on transverse axes of the said shiftable means and adapted to engage said peripheral surface; and a frame containing bearings into which are journaled the said drive shaft, driven shaft, direct-drive element, and annular drive and driven elements.

21. A gearing of the class described comprising a drive shaft and a driven shaft coaxial therewith, a gearing establishing a driving connection between the drive shaft and the driven shaft, said gearing including ring gear elements coaxial with the drive and driven shafts, there being two ring gear elements one driven and one driving and pertaining to two different speeds placed between two ring gear elements one driving and one driven of another single speed.

22. In a transmission gearing adapted to transmit power from a drive shaft to a driven shaft, conjugate and non-conjugate annular drive and driven elements fixedly mounted to a frame, independent drive connection between invariable pairs of such annular drive and driven elements, shiftable means to establish driving connection from drive shaft to said annular drive and driven elements, shiftable means to establish drive connection from such annular drive and driven elements to said driven shaft; and a direct-drive element adapted to establish direct rotational connection between the shiftable means of the drive shaft and the shiftable means of the driven shaft whereby both shafts, both shiftable carriages, and the direct-drive element will revolve as a unit.

23. In a transmission gearing adapted to transmit power from a drive shaft to a driven shaft, conjugate and non-conjugate annular drive and driven elements fixedly mounted to a frame, independent drive connection between invariable pairs of such annular drive and driven elements, shiftable means to establish driving connection from drive shaft to said annular drive and driven elements, transverse rollers mounted on said shiftable means to establish frictional contact with said annular drive and driven elements, shiftable means to establish drive connection from such annular drive and driven elements to said driven shaft, transverse rollers mounted on said second shiftable means to establish frictional contact with said annular drive and driven elements, a direct-drive element, adapted to establish direct rotational connection between the shiftable means of the drive shaft and the shiftable means of the driven shaft; and all of such annular drive elements, driven elements, and the direct-drive element together forming a continuous coaxial sectional cylindrical interior surface of constant diameter.

24. A multiple-speed transmission mechanism, consisting of a drive shaft, a driving shiftable clutch assembly employing transverse rollers positioned an unvarying radial distance from the axis of rotation of said shaft, a driving annular gear, a driving pinion, a countershaft, a driven pinion, a similar driven annular gear, a similar driven shiftable clutch assembly employing transverse rollers positioned an unvarying radial distance from the axis of rotation of said shaft, a similar driven shaft, all of such said annular gear elements having a least radius about the drive shaft equal to the greatest radius of said clutch assemblies.

25. In a multiple speed transmission mechanism, a drive shaft, a gear element in the shape of an annular ring adapted to be driven by the drive shaft, and shiftable means to establish drive connection between said drive shaft and said driven gear element, gearing with secondary shaft connection from said annular gear element to a second similar annular gear element, a driven shaft, and shiftable means to establish drive connection between said second annular gear element and the driven shaft, said two annular gear elements being invariably interdependent upon each other, constituting invariably interdependent conjugate gear couples, a multiplicity of such invariably interdependent conjugate gear couples, and a multiplicity of separate independent secondary axles, there being one separate independent secondary axle for each set of two conjugate annular gear elements.

26. In a multiple speed transmission mechanism, a drive shaft, a gear element in the shape of an annular ring adapted to be driven by the drive shaft, and shiftable means to establish drive connection between said drive shaft and said driven gear element, gearing with secondary shaft connection from said annular gear element to a second similar annular gear element, a driven shaft, and shiftable means to establish drive connection between said second annular gear element and the driven shaft, and such an arrangement of said annular gear elements upon a common axis whereby annular gear elements an odd number of anuular gear thicknesses from the front end of the mechanism receive power from the drive shaft through the shiftable means, and annular gear elements an even number of annular gear thicknesses from the front end of the mechanism deliver power to the driven shaft through the shiftable means, or vice versa.

27. In a multiple speed transmission mechanism, a drive shaft, a gear element in the shape of an annular ring adapted to be driven by the drive shaft, and shiftable means to establish drive connection between said drive shaft and said driven gear element, gearing with secondary shaft connection from said annular gear element to a second similar annular gear element, a driven shaft, and shiftable means to establish drive connection between said second annular gear element and the driven shaft, said two annular gear elements being invariably interdependent upon each other, constituting invariably interdependent conjugate gear couples, and the two said annular gear elements of each single invariably interdependent conjugate gear couple being a space of three annular gear thicknesses apart.

28. In a multiple speed transmission mechanism, a drive shaft, a gear element in the shape of an annular ring adapted to be driven by the drive shaft, and shiftable means to establish drive connection between said drive shaft and said driven gear element, gearing with secondary shaft connection from said annular gear element to a second similar annular gear element, a driven shaft, and shiftable means to establish drive connection between said second annular gear element and the driven shaft, said shiftable means constituting a shiftable carriage with transverse rollers mounted on axles affixed thereto, the whole of which shiftable means being capable, on account of its relative size and shape, of having itself thrust through the hole in any or all of the annular gear elements aforesaid.

29. In a multiple speed transmission mechanism, a drive shaft, a gear element in the shape of an annular ring adapted to be driven by the drive shaft, and shiftable means to establish drive connection between said drive shaft and said driven gear element, gearing with secondary shaft connection from said annular gear element to a second similar annular gear element, a driven shaft, and shiftable means to establish drive connection between said second annular gear element and the driven shaft, said two annular gear elements being invariably interdependent upon each other, constituting invariably interdependent conjugate gear couples, a multiplicity of such invariably interdependent conjugate gear couples and all said annular gear elements being coaxially alined and having a common interior diameter, thereby forming a single sectional interior cylindrical surface.

30. In a multiple-speed transmission mechanism, a drive shaft, a gear element in the shape of an annular ring adapted to be driven by the drive shaft, shiftable means to establish drive connection between said drive shaft and said driven gear element, gearing and secondary shaft connection from said annular gear element to a second similar annular gear element, a driven shaft coaxially aligned with the drive shaft at the end of the drive shaft, shiftable means to establish drive connection between said second similar annular gear element and the driven shaft, and both such shiftable means so arranged and tightened as to remain continuously in driving engagement with some one or other of said annular gear elements.

31. In a multiple-speed transmission mechanism, a drive shaft, a gear element in the shape of an annular ring adapted to be driven by the drive shaft, shiftable means to establish drive connection between said drive shaft and said driven gear element, a second similar annular gear element, gearing and secondary shaft connection from said annular gear element to said second similar annular gear element, a driven shaft coaxially alined with the drive shaft at the end of the drive shaft, shiftable means to establish drive connection between said second similar annular gear element and the driven shaft; said shafts, said shiftable clutch assemblies, all annular gears, both driving and driven, rotatable about a single axis; and each of such said annular gears and said other annular elements having a single continuous interior surface of the same radius, adapted to be engaged, frictionally by transverse rollers mounted on fixed levers of the clutch assemblies.

32. In a multiple-speed transmission mechanism; a drive shaft with a shiftable carriage affixed thereto; lever-bars secured in said shiftable carriage; transverse axles journaled into said lever-bars; rollers mounted on said transverse axles; annular gear elements wholly outside of said shiftable carriage, lever-bars, axles and rollers; said annular gear elements adapted to be driven by frictional contact with said transverse rollers; gearing and shafting connection from one to one other such annular gear element; a driven axle having a common axis with the driving axle; a second shiftable carriage similar to the aforementioned carriage and shiftable in cooperation with it; said second shiftable carriage affixed to and shiftable longitudinally on the driven axle; lever-bars secured in said second shiftable carriage; transverse axles journaled into said second lever-bars; rollers mounted on said second transverse axles; said second series of rollers adapted to frictionally engage said annular gear elements; all of said annular gear elements journaled into suitable holding members of the frame and the said drive and driven axles journaled into the same frame.

33. In a multiple-speed transmission mechanism, a drive shaft, a gear element in the shape of an annular ring adapted to be driven by the drive shaft, shiftable means to establish drive connection between said drive shaft and said driven gear element by means of transverse rollers mounted on levers of said shiftable means, a gearing and secondary shaft connection from said annular gear element to a second similar annular gear element, a driven shaft, a second shiftable means to establish drive connection between said second annular gear element and the driven shaft by means of transverse rollers mounted on levers of said second shiftable means, said annular gear element and said second annular gear element being constantly interdependent upon each other, thereby constituting interdependent conjugate gear couples; a series of such interdependent conjugate gear couples; and all interdependent conjugate gear couples disposed about the drive and driven shafts rotatable and centered about the same single axis as said drive and driven shafts.

HERBERT G. ALTVATER.